(12) United States Patent
Billingsley, Jr.

(10) Patent No.: US 11,064,688 B2
(45) Date of Patent: Jul. 20, 2021

(54) ELECTRONIC INSECT-CONTROL SYSTEM

(71) Applicant: Frank Billingsley, Jr., Pittsburgh, PA (US)

(72) Inventor: Frank Billingsley, Jr., Pittsburgh, PA (US)

( * ) Notice: Subject to any disclaimer, the term of this patent is extended or adjusted under 35 U.S.C. 154(b) by 382 days.

(21) Appl. No.: 15/633,427

(22) Filed: Jun. 26, 2017

(65) Prior Publication Data

US 2017/0367314 A1    Dec. 28, 2017

Related U.S. Application Data

(60) Provisional application No. 62/493,271, filed on Jun. 27, 2016.

(51) Int. Cl.

| | |
|---|---|
| *A01M 1/22* | (2006.01) |
| *A01M 1/04* | (2006.01) |
| *F21K 9/235* | (2016.01) |
| *F21K 9/238* | (2016.01) |
| *F21K 9/232* | (2016.01) |
| *F21V 3/06* | (2018.01) |
| *H05B 47/19* | (2020.01) |
| *F21Y 115/10* | (2016.01) |
| *F21Y 113/20* | (2016.01) |

(52) U.S. Cl.
CPC ............... *A01M 1/223* (2013.01); *A01M 1/04* (2013.01); *F21K 9/232* (2016.08); *F21K 9/235* (2016.08); *F21K 9/238* (2016.08); *F21V 3/061* (2018.02); *H05B 47/19* (2020.01); *F21Y 2113/20* (2016.08); *F21Y 2115/10* (2016.08)

(58) Field of Classification Search
CPC ........ A01M 1/223; A01M 1/04; A01M 1/106; A01M 1/22; A01M 21/046; A01M 29/24; A01M 3/025
USPC .......................... 43/112, 107, 113, 132.1, 98
See application file for complete search history.

(56) References Cited

U.S. PATENT DOCUMENTS

| | | | |
|---|---|---|---|
| 3,935,662 A * | 2/1976 | Hamid .................... | A01M 1/04 43/112 |
| 2003/0056426 A1* | 3/2003 | Nelson .................. | A01M 1/145 43/112 |
| 2007/0014549 A1* | 1/2007 | Demarest ............. | A61M 11/041 392/393 |

(Continued)

FOREIGN PATENT DOCUMENTS

WO    WO-2017045092 A1 *    3/2017    .............. A01M 1/04

OTHER PUBLICATIONS

Coxworth, ZappLight bulb turns ordinary lamps into bug-killers, website, http://newatlas.com/zapplight-mosquito-led-light-bulb/41725/ (1 page) (Feb. 8, 2016).

(Continued)

*Primary Examiner* — Peter M Poon
*Assistant Examiner* — Jeffrey R Larsen
(74) *Attorney, Agent, or Firm* — Cafardi, Ferguson, Wyrick, Weis & Gabriel, LLC; Andrew M. Gabriel

(57) ABSTRACT

One embodiment provides a system, including: a first end that screws into a light bulb socket; an internal light source; an electric insect control mechanism disposed around and proximate to the internal light source; and a visible light source disposed at an opposite end with respect to the first end. Other embodiments are described and claimed.

9 Claims, 1 Drawing Sheet

(56) References Cited

U.S. PATENT DOCUMENTS

2009/0293341 A1* 12/2009 Fleming .................. A01M 1/04
                                                                                       43/113
2014/0352200 A1* 12/2014 Tremble .................. A01M 1/04
                                                                                       43/112

OTHER PUBLICATIONS

Baschoni, GE Bug Zapper Light Bulb, YouTube Video, Jun. 15, 2015, https://www.youtube.com/watch?v=VWfD0cah0AU.

* cited by examiner

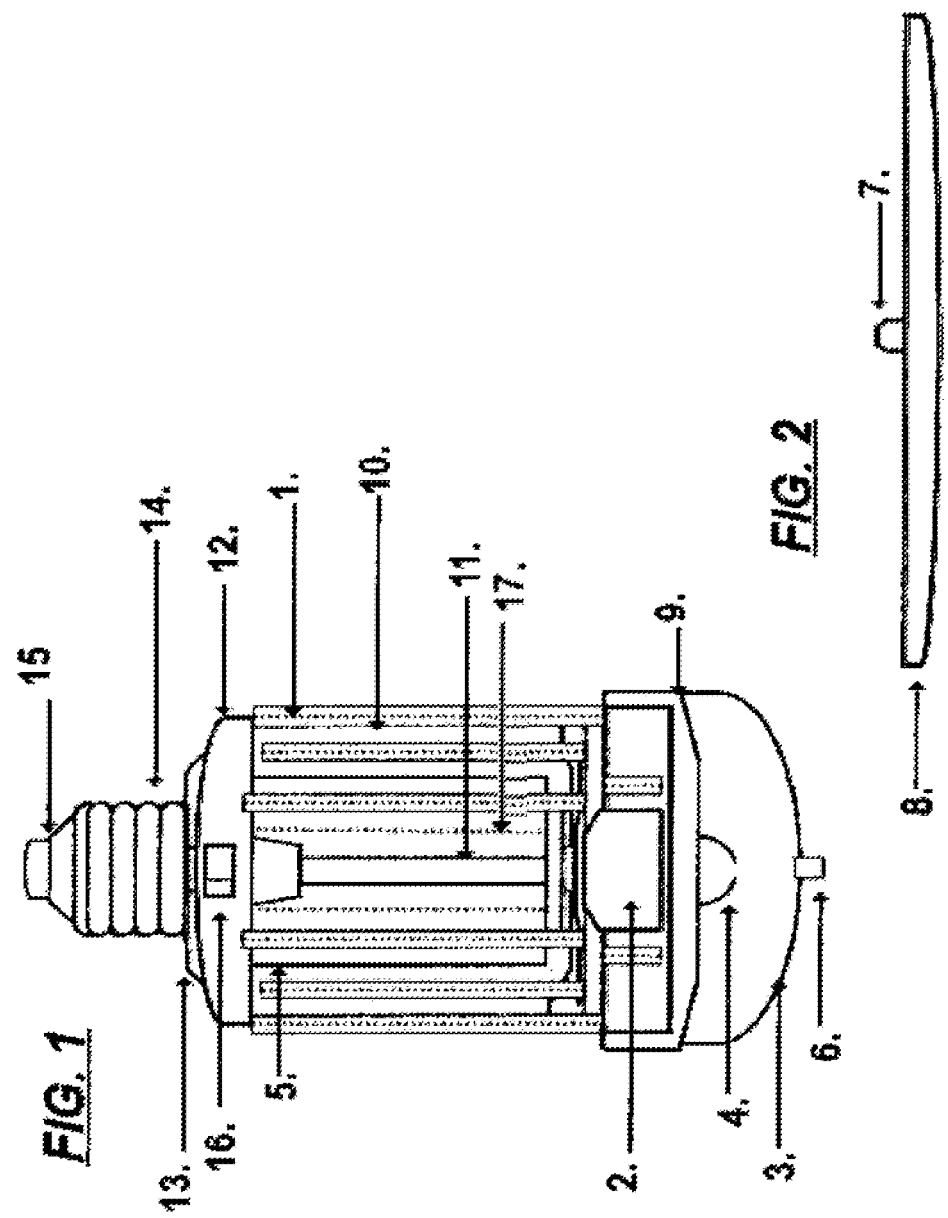

ELECTRONIC INSECT-CONTROL SYSTEM

This application claims priority to U.S. Provisional Patent Application Ser. No. 62/493,271, entitled "Bug zapper light bulb," and filed on Jun. 27, 2016, the contents of which are fully incorporated by reference as if set forth in their entirety herein.

FIELD

The subject matter described herein relates to an insect-control device and specifically relates to a combined light-bulb and electronic insect-control system.

BACKGROUND

Traditionally light sources such as light bulbs attract insects, e.g., mosquitoes, flies, etc., and therefore are a source of discomfort, particularly when used in outdoor settings in certain climates. Conventionally electrical mechanisms for killing insects (electronic insect-control systems or "bug zappers") have been constructed as stand-alone-units that operate by being plugged into a commercial power source (i.e., use a cord that inserts into a two or three-pronged wall plug). These units typically include an internal light source of some type as an attractant or lure for the insects, i.e., the light source is integrated into a main or central part of the device proximate to electrified meshes. For example, an internal light source included in the center of the unit to attract insects to the electrical mechanism might include a light bulb that produces fluorescent light that attracts insects. Alternatively, mercury, neon or ultraviolet (black light) may be produced near the electrical mechanism to lure insects into it.

BRIEF SUMMARY

In summary, one embodiment provides a system, comprising: a first end that screws into a light bulb socket; an electric insect control mechanism including electrified meshes disposed around and proximate to an internal light source; and a visible light source disposed at an opposite end with respect to the first end.

In an embodiment, the internal light source, the electrified meshes, and the visible light source all derive power from a commercial power supply derived from a light bulb socket.

In an embodiment, the internal light source is a fluorescent light source.

In an embodiment, the visible light source comprises an LED or an incandescent filament.

In an embodiment, the system includes a wireless communication mechanism.

In an embodiment, the system comprises control circuitry that receives control input via the wireless communication mechanism.

In an embodiment, the system comprises a non-transitory memory including a control program that receives control input via the wireless communication mechanism.

In an embodiment, one or more of the internal light source, the electric insect control mechanism and the visible light source are variably controlled.

In an embodiment, the one or more of the internal light source, the electric insect control mechanism and the visible light source are variably controlled via remote input.

In an embodiment, the remote input is received via wireless communication.

In an embodiment, a tray reversibly attaches to the opposite end.

An embodiment includes a remote-control device, e.g., a smart phone that runs a control application to wirelessly control the system.

An embodiment includes methods for controlling a system as described herein, or individual components thereof, individually, variably, or collectively.

An embodiment includes a control program that may be downloaded or remotely accessed and used to control a system or components thereof, as described herein.

The foregoing is a summary and is not intended to be in any way limiting. For a better understanding of the example embodiments, reference can be made to the detailed description and the drawings. The scope of the invention is defined by the claims.

BRIEF DESCRIPTION OF THE SEVERAL VIEWS OF THE DRAWINGS

FIG. 1 illustrates an example system according to an embodiment.

FIG. 2 illustrates an example attachment according to an embodiment.

DETAILED DESCRIPTION

It will be readily understood that the components of the embodiments, as generally described and illustrated in the figures herein, may be arranged and designed in a wide variety of ways in addition to the examples described herein. The detailed description uses examples, represented in the figures, but these examples are not intended to limit the scope of the claims.

Reference throughout this specification to "embodiment(s)" (or the like) means that a particular described feature or characteristic is included in that example. This particular feature or characteristic may or may not be claimed. This particular feature may or may not be relevant to other embodiments. For the purpose of this detailed description, each example might be separable from or combined with another example, i.e., one example is not necessarily relevant to other examples.

Therefore, the described features or characteristics of the examples generally may be combined in any suitable manner, although this is not required. In the detailed description, numerous specific details are provided to give a thorough understanding of example embodiments. One skilled in the relevant art will recognize, however, that the claims can be practiced without one or more of the specific details found in the detailed description, or the claims can be practiced with other methods, components, etc. In other instances, well-known details are not shown or described in detail to avoid obfuscation.

An embodiment provides a "bug zapper" or electronic insect control apparatus or device, which includes an internal light source as part of the electronic insect control mechanism, and provides an additional, visible light source such as an LED or incandescent filament, along with the electronic insect control mechanism. It is noted that the internal light source might also be a "visible" light source, but is distinguished from the additional light source in that the internal light source's primary function is to attract insects, whereas the additional, visible light source's primary function is to provide visible light. For example, in an embodiment, both an attractant or luring lightbulb (e.g., a fluorescent light stem) and a light source lightbulb (e.g. an incandescent lightbulb, an LED lightbulb, etc.) are provided, along with an electrical insect control mechanism.

In an embodiment, the bug zapper may operate as a lightbulb, as a bug zapper, or both simultaneously, based for example on a user's choice of operational mode. In an embodiment, an operational mode is preset, e.g., an embodiment may operate as both a lightbulb and as a bug zapper by simultaneous operation of both sub-units of the device.

In an embodiment, the bug zapper is operable in a variety of modes, for example as described herein, and the mode may be selected by a user. In an embodiment, a user may select the mode of operation for the bug zapper using a remote device, for example via a mobile phone or like device that runs an application and communicates with the bug zapper device, e.g., via BLUETOOTH wireless communication, near-field communication (NFC), and/or via another communication type. Alternatively, or additionally, the user may select the mode using a toggle switch or other input mechanism (e.g., keypad, touchscreen, etc.) provided with or integrated into the bug zapper device or apparatus.

The description now turns to the figures. The illustrated example embodiments will be best understood by reference to the figures. The following description is intended only by way of example and simply illustrates certain selected example embodiments.

Referring now to FIG. 1, an embodiment includes a combination lightbulb/electronic insect control system, including the following example components. By way of example, and not limitation, illustrated in FIG. 1 is a system in which wire grids 1 enclose a fluorescent light stem 11 and internal grids 17, in turn supported by a frame housing 10, e.g., made of plastic or electrically grounded metal. The grids 1 may include a grid design to prevent intrusion of larger objects or touching the electrified grids 17 inside the device. Thermal fins 5 may be provided, as shown, in order to channel heat generated by grids 17.

Wire meshes of grids (e.g., two) are included in a sub-unit and surround the interior light bulb stem 11. These are electrified to kill insects. A transformer 12 electrifies the wire meshes, e.g., changing standard 120-volt (V) electrical-line voltage to 2,000 V. A fuse 13 is included, e.g., for transformer 12. The increased voltage is applied across the two wire-mesh grids 17, which are separated by a predetermined gap, e.g., about 2 mm, or about the size of an insect. The light stem 11 inside the wire meshes 17 lure the insects into the device. The grids 17 include holes or repeating patterns of openings that allow the insects to penetrate the device an enter into the space between the wire-meshes proximate to the light stem 11. An insect contacting both meshes completes an electric circuit and allows the electric current to flow through the insect to kill it.

As described herein, an embodiment additionally includes a light source 4, e.g., a light emitting diode (LED) or incandescent light filament, for example enclosed by a glass bulb 3, and is provided to produce light, e.g., to illuminate a room such as an outdoor porch or patio, etc. As illustrated, reflectors or other optics 9 may be included to produce or direct light in a given quantity, direction, etc. An LED driver 2 or other appropriate electronics may be included for controlling the powering of the light source 4 using power, e.g., derived from commercial source such as a light bulb socket into which the system is attached. In this regard, a DC power conversion unit 15, AC controller/contacts 14, and/or other suitable electronics may be provided in order to utilize the power source at hand. It will be appreciated that appropriate circuitry is included to transfer power from a light bulb socket to all of the electronic insect control mechanism, e.g., fluorescent light stem 11 and grids/meshes 17, and the light source 4, e.g., LED. Further, as described herein, these components may be variably controlled, e.g., using a remote control device, a manual switch 16, or a combination of the foregoing.

At an end of the system an attachment 6 is provided, e.g., an attachment mechanism 6 for a snap-on pan or tray 8, which in turn has a complimentary attachment mechanism 7 for releasably securing the tray 8 to the attachment point or mechanism 6. Each of these components 6, 7, 8, may be formed of plastic or other suitable material. The tray 8 is attached and used to catch dead insects as they fall from the grids 17 above.

As described herein, a mode selector or switch 16 may be included, e.g., for manually switching the light source, the electronic insect control sub-unit, or both, on or off. Again, these components may be controlled, individually or collectively, via a suitable remote device, e.g., a mobile phone that is equipped with a suitable mobile application to provide control signals through a wireless mechanism. As another example, a remote control might be provided, e.g., using IR or other wireless communication mechanism, to control the system. In such a case, a suitable communication sub unit (e.g., BLUETOOTH radio, IR receiver and circuitry, etc.) would be included in the system. For example, such a communication mechanism or component may be included in the LED driver and control housing 2. The control mechanism might include dedicated circuitry or may include a memory that stores a control program configured to use wirelessly input control signals, e.g., supplied by a remote control device such as a smart phone with a BLUETOOTH radio or other wireless transmission mechanism.

In this regard, an embodiment includes a downloadable or remotely accessed control application that controls the system. The control application includes for example a user interface, e.g., soft buttons or screen based controls of a graphical user interface (GUI), that permit a user to supply control inputs to a remote device, e.g., smart phone, tablet, etc. For example, a user supplies a control input to power on or off the electronic insect control sub-unit, e.g., light stem 11 and wire meshes 17, to power on or off the light source, e.g., LED 4, etc. In an embodiment, a slider or other arrangement may be included in the GUI to variably control the sub-units, e.g., to provide varying voltage to the light stem 11 and internal meshes 17, to supply varying power to the LED 4, alone or in combination. For example, a slider in the GUI may include a control that permits varying the power to various components of the system according to the slider position, similar to a dimmer switch. An embodiment may control these system components, including variable control (such as used with a dimmer switch) as a group, e.g., as a logical group defined by software, as a physical group defined by circuitry, etc., or individually.

It will be readily understood that certain embodiments can be implemented using any of a wide variety of devices or combinations of devices. An example device that may be used in implementing one or more embodiments includes a computing device or a computer system (e.g., control unit included within the bug zapper system or a remote device for the same).

The computer may execute program instructions or code configured to perform functionality of the embodiments, as described herein. Components of computer may include, but are not limited to, a processing unit, a system memory, and a system bus that couples various system components including the system memory to the processing unit. The computer may include or have access to a variety of non-transitory computer readable media. The system memory may include non-transitory computer readable storage media in the form of volatile and/or nonvolatile memory devices such as read only memory (ROM) and/or random-access memory (RAM). By way of example, and not limitation, system memory may also include an operating system, application programs, other program modules, and program data. For example, system memory may include a control application or program for controlling the bug zapper via a GUI or like interface, as described herein. Data may be transmitted by wired or wireless communication, e.g., from a remote control or computing device to another device, e.g., bug zapper system.

A user can interface with (for example, enter commands and information) the computer through input devices such as a touch screen, keypad, etc. A monitor or other type of display screen or device can also be connected to the system bus via an interface. The computer may operate in a networked or distributed environment using logical connections to one or more other remote devices. The logical connections may include a network, such local area network (LAN) or a wide area network (WAN), but may also include other networks/buses.

It should be noted that the various functions described herein may be implemented using processor executable instructions stored on a non-transitory storage medium or device. A non-transitory storage device may be, for example, an electronic, electromagnetic, or semiconductor system, apparatus, or device, or any suitable combination of the foregoing. More specific examples of a non-transitory storage medium include the following: a portable computer diskette, a hard disk, a random-access memory (RAM), a read-only memory (ROM), an erasable programmable read-only memory (EPROM or Flash memory), a portable compact disc read-only memory (CD-ROM), or any suitable combination of the foregoing. In the context of this document "non-transitory" includes all media except non-statutory signal media.

Program code embodied on a non-transitory storage medium may be transmitted using any appropriate medium, including but not limited to wireless, wireline, optical fiber cable, RF, etc., or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, and the connection may be made through other devices (for example, through the Internet using an Internet Service Provider), through direct wireless connections, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific blocks or items are used in the figures, and a particular ordering of blocks or items has been illustrated, these are non-limiting examples. In certain contexts, two or more blocks or items may be combined, a block or item may be split into two or more blocks or items, or certain blocks or items may be re-ordered or re-organized or omitted as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A system, comprising:
   a first end configured to attach to a light bulb socket;
   an opposite end; and
   a middle part fixed between the first end and the opposite end;
   the middle part comprising:
      an internal electric insect control mechanism including an internal electrified grid that surrounds an internal light source, the internal electrified grid comprising two grid components separated by a gap and having a voltage applied across the two grid components; and
      external grids that surround and enclose the internal electrified gird and that permit insect entry into the internal electric insect control mechanism but prevent touching of the internal electrified grid;
   the opposite end defining a compartment separate from the middle part, comprising:
      optics comprising a light emitting diode (LED) that is separate from the internal light source; and
      a cover that covers the visible light source LED but does not extend over the middle part;
   the system comprising control circuitry that is preset to a mode that powers both (a) the LED and (b) the electric insect control mechanism including the internal light source at the same time;
   wherein the control circuitry modifies, in response to subsequent user input, the mode that is preset to power both (a) the LED and (b) the electric insect control mechanism including the internal light source at the same time to control, independently, the electric insect control mechanism including the internal light source and (ii) the LED.

2. The system of claim 1, wherein the internal light source, the internal electrified grid, and the LED all are configured to derive power from a commercial power supply via the first end.

3. The system of claim 1, wherein the internal light source is a fluorescent light source.

4. The system of claim 1, comprising a wireless communication mechanism.

5. The system of claim 4, wherein the control circuitry receives control input via the wireless communication mechanism.

6. The system of claim 4, wherein one or more of the internal light source, the electric insect control mechanism and the LED are variably controlled.

7. The system of claim 4, wherein the one or more of the internal light source, the electric insect control mechanism and the LED are variably controlled via remote input.

8. The system of claim 7, wherein the remote input is received via wireless communication.

9. The system of claim 1, comprising a tray attached to the opposite end.

\* \* \* \* \*